UNITED STATES PATENT OFFICE.

WILLIAM F. A. SCHRADER, OF BROOKLYN, NEW YORK, ASSIGNOR TO TRAUN RUBBER CO., OF COLLEGE POINT, NEW YORK, A CORPORATION OF NEW JERSEY.

PROCESS OF PRODUCING ELASTIC AND SCENTED RUBBER SHEETING.

No. 822,309. Specification of Letters Patent. Patented June 5, 1906.

Application filed September 22, 1904. Serial No. 225,468.

*To all whom it may concern:*

Be it known that I, WILLIAM F. A. SCHRADER, a citizen of the United States of America, and a resident of Brooklyn, county of Kings, State of New York, have invented certain new and useful Improvements in Processes of Producing Elastic and Scented Rubber Sheeting, of which the following is a specification.

This invention relates to a novel process of producing highly elastic and scented rubber sheeting.

It is the special object of this invention to produce thin highly-elastic rubber sheeting which is perfumed or scented, and thereby caused to be fragrant, having then an agreeable odor which is emitted during the use of same.

By my novel process of making the scented rubber goods perfumes are compounded or incorporated with the rubber mass and form a constant component of same, being distributed throughout the entire mass. The perfumes are incorporated with the mass during the early stage of the process. They are employed in powdered form and admixed in such a manner that the fragrance of same is retained during and after the processes of vulcanization.

My novel process of incorporating solid perfumes in powdered forms is particularly devised for the production of thin and highly-scented elastic sheeting which is used by dentists for rubber dams and in ladies' dress-shields. Such rubber sheeting is very elastic and tough, and solid perfumes only can be used in its manufacture, because the sheeting consists of pure rubber. For making highly-elastic goods resins or gums which may occur in the raw rubber have to be washed out, so that solely pure rubber remains. Oils and moist substances are occasionally employed in hard-rubber compounds which are used for insulation and other purposes. Such hard-rubber compounds also contain oxid of zinc, whiting, &c., and the presence of oils in solid molded goods of that description does not do any harm. Likewise, gum-benzoin has been used as a component in gum compounds used in the manufacture of vulcanized cloth. This gum-benzoin contains resinous substances, benzoic acid, and essential oil, which latter impairs the good qualities of this elastic rubber sheeting, as it makes same porous and spongy. Gum-benzoin, further, is not a well-defined chemical substance of uniform constitution. It is a mixture of numerous substances and varies in quality and composition. Therefore it cannot be used for manufacturing thin and highly-elastic rubber-dam sheeting, because no uniform product can be produced thereby and, owing to the fact that it contains oils, it makes such goods porous and spongy.

As is well known, a disagreeable odor is emitted from rubber goods manufactured according to the processes heretofore known to the art. This is particularly the case with rubber sheeting employed for making the so-called "rubber dams," which are forced around a tooth, so as to keep the saliva from the cavity under treatment. The obnoxious odor which issues from the former kind of rubber dams while in the mouth of the patient makes the treatment of teeth very unpleasant. These dams when made of my scented rubber sheeting emit a mild and agreeable odor of perfume during the treatment of the tooth. Likewise a disagreeable odor issues from dress-shields when the impervious rubber sheets forming part of same become warm by the heat of the human body. However, when the dress-shields are provided with impervious layers made of my scented rubber sheeting then an odor of perfume is perceptible.

The perfumes employed in this process do not impair the usual good qualities of the rubber. Any perfume obtainable in powdered form may be used. Such substances are, for instance, heliotropin, cumarin, and nerolin. These substances are crystalline and may be easily reduced to powder.

The percentage of perfume introduced into the rubber mass depends on the strength of the particular substance employed. However, a small percentage of perfume answers all practical purposes.

In carrying my invention into practice I substantially proceed as follows: Raw rubber is well washed, then thoroughly cleaned and completely dried in the usual manner. The well-dried material is then ground in a rubber-mill. Now the perfume in powdered form is compounded or incorporated with the ground-rubber mass either by grinding together the rubber mass and the perfume powder or in any other suitable manner. The product thus obtained is then calendered until it has the desired thickness. The rubber sheeting produced by calendering is now vulcanized in the usual manner, after which treatment the goods are finished and ready for sale and use.

The agreeable odor of perfume is not expelled during the process of vulcanizing the goods and same remain fragrant. This quality makes the goods adapted for use in any instance where an agreeable odor is desirable.

In the described manner I have provided scented rubber sheeting by my novel process which may be employed in any instance where the use of the former unscented goods are unpleasant and undesirable.

Having thus described my invention, I claim as new and desire to secure by Letters Patent—

1. The process of producing thin, scented rubber-dam sheeting consisting in incorporating with pure ground rubber solid perfumes of uniform chemical constitution in powdered form, calendering the product thus obtained until it has the thickness of fine rubber-dam sheeting, and vulcanizing same.

2. The process of producing scented rubber-dam sheeting consisting in incorporating with the pure ground rubber crystallized perfumes in powdered form, calendering the product thus obtained until it has the thickness of rubber-dam sheeting and vulcanizing same.

Signed at New York, N. Y., this 21st day of September, 1904.

WILLIAM F. A. SCHRADER.

Witnesses:
NICHOLAS CELIA,
HATTIE B. LUEDERS.